Patented May 1, 1951

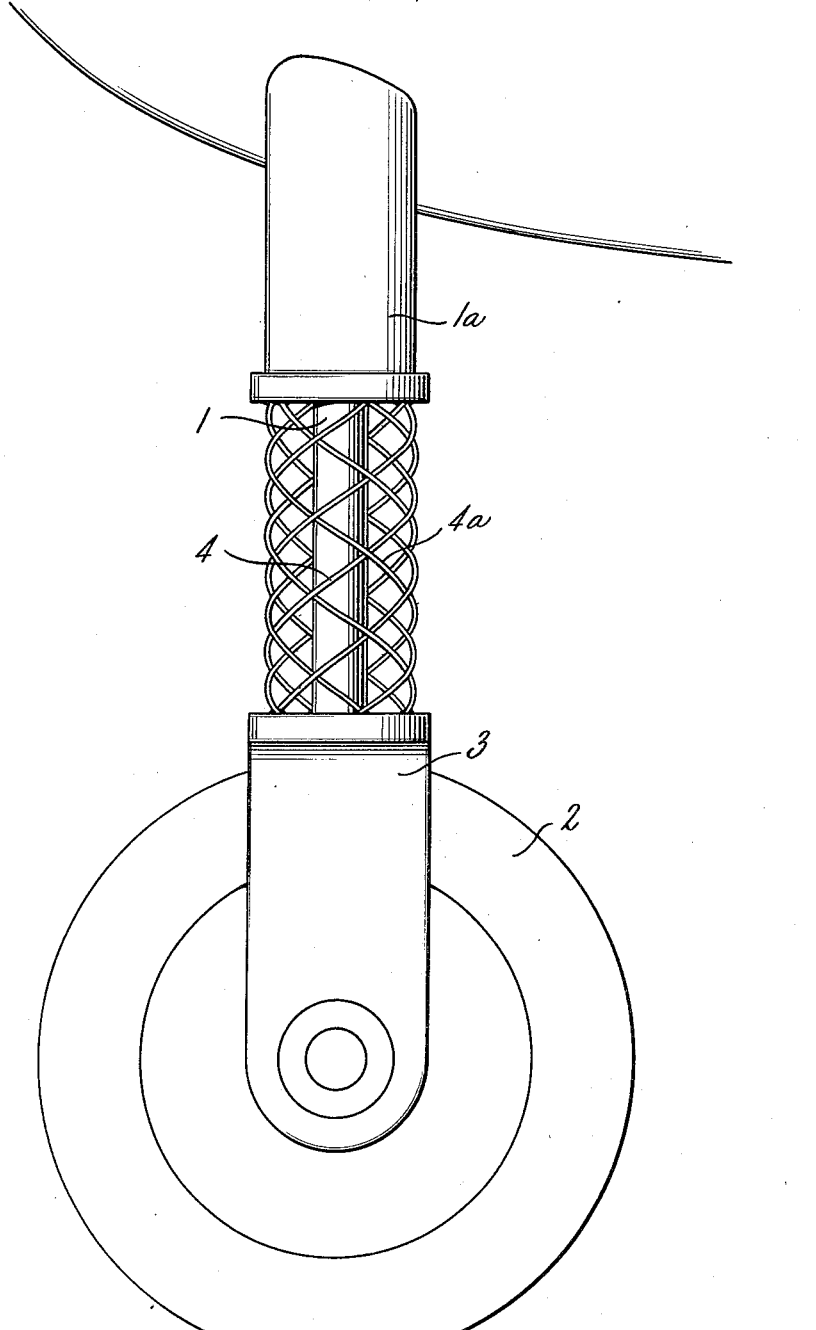

2,551,410

UNITED STATES PATENT OFFICE 2,551,410

DEVICE FOR PREVENTING SLIDING PARTS FROM ROTATING

Pierre Guillaume Joseph Marie Audemar, Villennes-sur-Seine, France

Application November 10, 1947, Serial No. 785,130 In France June 24, 1942

Section 1, Public Law 690, August 8, 1946 Patent expires June 24, 1962

2 Claims. (Cl. 267—61)

This invention relates to mounting arrangements for a member sliding on a fixed part of a machine, and in particular, but not exclusively, to mounting arrangements for wheels on the legs of landing gears for aeroplanes.

The object of the present invention, while permitting free sliding of the movable member with respect to the fixed part, is strictly to prevent any relative rotational movement of said member about its sliding axis.

Devices of this kind are already known which consist of two helical springs wound in an opposite direction and secured to the fixed part at one end and to the movable part at the other end. Where the various turns of the two springs cross one another they are pivotally connected by pins, in order to resist the torque and to ensure the necessary mechanical strength of the assembly.

The device according to the invention, which is much simpler and affords a greater mechanical strength than the known devices, is constituted by a sleeve of metallic fabric made of resilient crossed wires or the like, each wire or the like being secured at one end to the sliding member and at the other end to the fixed part, which sleeve is capable of deformations in the axial direction but resists torsional stresses.

A preferred embodiment of the present invention will be hereinafter described, by way of example only, with reference to the accompanying drawing, the single figure of which is a diagrammatic elevational view of an embodiment of the device supposed to be applied to the suspension of an aeroplane.

The drawing shows a landing gear strut including a fixed part 1a, that is to say a part directly carried by the body of the aeroplane, and a sliding part 1 mounted on the fork 3 in which wheel 2 is mounted. The problem is, while permitting vertical sliding displacement of the part 1, to prevent said part from turning about the longitudinal axis common to both parts 1 and 1a, that is to say to keep the wheel 2 in a fixed vertical plane with respect to the body of the aeroplane.

According to the invention, there is provided, between part 1a of the strut and part 1, or what is equivalent to this, between part 1a and fork 3, a structure constituted by a metallic network of crossed wires 4 and 4a, such a network being capable of deforming in the sliding direction of the strut but resisting any torsional stress applied thereto.

As shown in the drawing, each metal wire, for instance 4, passes alternately over and under the wires 4a that it crosses. This interweaving of the wires prevents any torsional deformation of the whole and keeps wheel 2 in a fixed plane with respect to the body of the aeroplane.

It will be understood that the invention is not limited to the particular application described and shown, for many other applications may be contemplated without departing from the spirit of the invention as defined by the accompanying claims.

Having thus described the invention, what is claimed as new and desired to be secured by Letters Patent, is:

1. A device for mounting a longitudinal member in slidable relation to a fixed part and in the direction of its longitudinal axis while preventing said member from carrying out rotational movement about said axis; comprising a sleeve of metallic mesh made of resilient crossed wires, each wire passing alternately over and under the wire that it crosses, one end of said sleeve being secured to said member and the opposite end of said sleeve being connected to said fixed part, said sleeve being capable of deformations in the direction of said longitudinal axis but resisting torsional stresses.

2. Landing gear for aircraft, comprising a wheel carrying leg slidable in a fixed part connected to the aircraft body, and a sleeve of metallic fabric made of resilient crossed wires, each wire of said fabric passing alternatively over and under the wires that it crosses and being secured at one end to said wheel carrying leg and at the other end to said fixed part, said sleeve being capable of deformations in the axial direction but resisting torsional stresses.

PIERRE GUILLAUME JOSEPH
MARIE AUDEMAR.

REFERENCES CITED

The following references are of record in the file of this patent:

UNITED STATES PATENTS

| Number | Name | Date |
|---|---|---|
| 1,290,549 | Harden | Jan. 7, 1919 |
| 1,349,079 | Markham | Aug. 10, 1920 |
| 2,212,922 | Mercier | Aug. 27, 1940 |
| 2,367,467 | Mercier | Jan. 16, 1945 |
| 2,367,944 | Ingalls | Jan. 23, 1945 |